US009992684B2

(12) United States Patent
Li (10) Patent No.: US 9,992,684 B2
(45) Date of Patent: *Jun. 5, 2018

(54) CLUSTERING METHOD AND APPARATUS (71) Applicant: Huawei Technologies Co., Ltd., Shenzhen, Guangdong (CN)

(72) Inventor: Dejian Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days. days.

This patent is subject to a terminal disclaimer.

(21) Appl. No.: 15/487,199

(22) Filed: Apr. 13, 2017

(65) Prior Publication Data

US 2017/0223548 A1 Aug. 3, 2017

Related U.S. Application Data (63) Continuation of application No. 14/845,587, filed on Sep. 4, 2015, now Pat. No. 9,648,499, which is a (Continued)

(30) Foreign Application Priority Data

Mar. 6, 2013 (CN) .......................... 2013 1 0070005

(51) Int. Cl.
*H04W 56/00* (2009.01)
*H04W 72/04* (2009.01)
(Continued)

(52) U.S. Cl.
CPC ......... *H04W 16/10* (2013.01); *H04J 11/0056* (2013.01); *H04L 5/001* (2013.01); *H04L 27/0006* (2013.01); *H04W 72/0446* (2013.01)

(58) Field of Classification Search
CPC ........... H04L 27/0006; H04W 56/001; H04W 72/04; H04W 72/044; H04W 72/0446
See application file for complete search history.

(56) References Cited

U.S. PATENT DOCUMENTS 9,769,705 B2 * 9/2017 Li .......................... H04W 28/26
2005/0157676 A1 7/2005 Kwak et al.
(Continued)

FOREIGN PATENT DOCUMENTS

CN 102196470 A 9/2011
CN 103179572 A 6/2013
(Continued)

OTHER PUBLICATIONS

"Part 11: Wireless LAN Medium Access Control (MAC) and Physical Layer (PHY) Specifications; Amendment 3: Enhancements for Very High Throughput in the 60 GHz Band", IEEE Std 802.11ad-2012, Dec. 28, 2012, 628 pages.
(Continued)

*Primary Examiner* — Scott M Sciacca (57) ABSTRACT

Embodiments of the present invention disclose a clustering method, including: adjusting, by a first device, a beginning of its own first small bandwidth beacon transmission interval to be aligned with a selected empty Beacon SP, setting its own BI to be equal to a synchronization device beacon interval S-BI, and joining, after accordingly adjusting an interval VBI for sending a beacon frame on a large bandwidth channel and an interval SBBI for sending a beacon frame on a small bandwidth channel, a target small bandwidth cluster; or sending a beacon frame including a cluster probe IE over a large bandwidth channel, requesting, by using the cluster probe IE, a synchronization PCP to return cluster synchronization information and control information, and joining the target large bandwidth cluster according the information and a second PCP.

20 Claims, 4 Drawing Sheets

Related U.S. Application Data continuation of application No. PCT/CN2014/072479, filed on Feb. 25, 2014.

(51) Int. Cl.
*H04W 16/10* (2009.01)
*H04L 5/00* (2006.01)
*H04L 27/00* (2006.01)
*H04J 11/00* (2006.01)

(56) References Cited

U.S. PATENT DOCUMENTS

| | | |
|---|---|---|
| 2011/0199966 A1 | 8/2011 | Cordeiro et al. |
| 2013/0329712 A1 | 12/2013 | Cordeiro |
| 2014/0177543 A1 | 6/2014 | Cordeiro |

FOREIGN PATENT DOCUMENTS

| | | |
|---|---|---|
| KR | 10-2011-0102253 | 9/2011 |
| WO | WO 2012/121676 A1 | 9/2012 |

OTHER PUBLICATIONS

"Part 15.3: Wireless Medium Access Control (MAC) and Physical Layer (PHY) Specifications for High Rate Wireless Personal Area Networks (WPANs); Amendment 2: Millimeter-wave-based Alternative Physical Layer Extension", IEEE Std 802.15.3c-2009, Oct. 12, 2009, 203 pages.

"High Rate 60 GHz PHY, MAC and PALs", Standard ECMA-387, Dec. 2010, 302 pages.

\* cited by examiner

FIG. 5

CLUSTERING METHOD AND APPARATUS

CROSS-REFERENCE TO RELATED APPLICATIONS

This application is a continuation of U.S. application Ser. No. 14/845,587, filed on Sep. 4, 2015, which is a continuation of International Application No. PCT/CN2014/072479, filed on Feb. 25, 2014, which claims priority to Chinese Patent Application No. 201310070005.7, filed on Mar. 6, 2013. All of the afore-mentioned patent applications are hereby incorporated by reference in their entireties.

TECHNICAL FIELD

The present invention relates to the field of communications technologies, and in particular, to a clustering method and apparatus.

BACKGROUND

Figure 1:
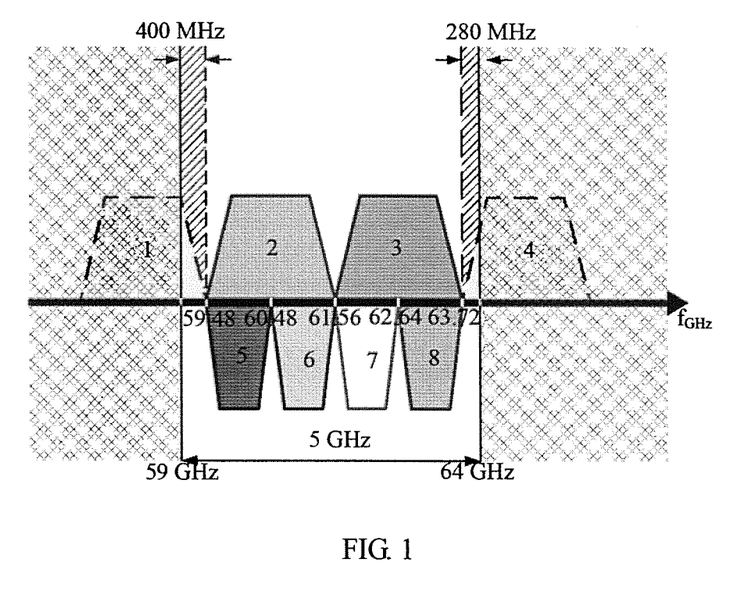
FIG. 1 is a schematic diagram of channelization adopted in IEEE 802.11ad and CWPAN in the prior art.

60 GHz wireless communications belongs to millimeter wave communication, and has advantages such as a large channel capacity, high transmit power, great directivity, and good international commonality, thereby having a good prospect of wireless application. In an aspect of millimeter wave standard fotmulation, at present, there are mainly U.S Institute of Electrical and Electronics Engineers (IEEE Institute of Electrical and Electronics Engineers, IEEE for short) 802.15.3c, 802.11ad and 802.11aj, European Computer Manufacturers Association (European Computer Manufacturers Association, ECMA for short) 387, standards that are being foLiuulated by China Wireless Personal Area Network (China Wireless Personal Area Network, CWPAN for short) PG4 (60 GHz Project Group), and the like. Refer to FIG. 1, which is a schematic diagram of channelization used in IEEE 802.11ad and CWPAN PG4. There is only one type of channel bandwidth, that is, a channel bandwidth of 2.16 GHz, in the channelization used in IEEE 802.11ad, which includes channels numbered 1 to 4. There is only 5 GHz, that is 59-64 GHz, in the 60 GHz license-exempt frequency band allocated to China, which is smaller than a bandwidth of 7-9 GHz of other countries and corresponds to two physical channels, numbered 2 and 3, in 802.11ad. The 60 GHz frequency band channelization accepted by CWPAN PG4 is to further channelize the international 2.16 GHz bandwidth into two 1.08 GHz sub-channels. In this way, the 5 GHz bandwidth includes six logical channels with variable bandwidth, including two channels of the 2.16 GHz bandwidth and four channels of the 1.08 GHz bandwidth. The two channels of the 2.16 GHz bandwidth separately correspond to channels 2 and 3 in IEEE 802.11ad, and the four channels of the 1.08 GHz bandwidth are channels 5 to 8 shown in FIG. 1. Although channel 5 or 6 is different from channel 2 and channel 7 or 8 is different from channel 3, they are strongly interfering co-frequency channels of each other. When the 60 GHz frequency band channelization scheme proposed by CWPAN PG4 is used, there will be multiple interference channels. For example, for channel 2, in addition to large bandwidth channel interference brought by an exactly same channel, that is, channel 2, there is also interference brought by two small bandwidth sub-channels 5 and 6 that overlap channel 2. Channel 2 is a co-frequency large bandwidth channel of channel 5 or 6, and channel 3 is a co-frequency large bandwidth channel of channel 7 or 8; therefore, channel 2 or 3 may be referred to as a large bandwidth channel for short, and channels 5, 6, 7, and 8 may be referred to as a small bandwidth channel for short.

Although beamforming used in IEEE 802.11ad has an inner interference suppression function due to a relatively narrow beam, a problem of interference still commonly exists in an office environment with dense work stations and co-frequency channel interference from a neighboring work station is still severe. In IEEE 802.11ad, a method for clustering between personal basic service set control points (Personal Basic Service Set Control Point, PCP for short) or access points (Access Point, AP for short) is proposed to solve the problem of interference between basic service sets (Basic Service Set, BSS for short). The following uses a PCP as an example for description. PCPs that have a decentralized clustering capability and run on a same channel may constitute a decentralized cluster. A PCP in the cluster may receive a directional multi-gigabit beacon frame (Directional Multi-Gigabit Beacon, DMG Beacon for short) and/or announcement frame that is sent by another PCP, includes scheduling information, and is of a 60 GHz technology, so as to schedule communication in a non-overlapping time period and reduce interference. However, the foregoing method is limited to only clustering between co-channel PCPs with equal bandwidth; when a large number of PCPs with different bandwidth and on difference channels exist, co-existence fails due to severe interference.

In the prior art, during formulation of 60 GHz technical standards by CWPAN PG4, Institute for Infocomm Research (Institute for InfocommResearch, I2R for short) in Singaporeputs forward a network coexistence scheme supporting dynamic bandwidth control, where a small bandwidth PCP periodically sends a beacon frame on a large bandwidth channel so that a device complying with IEEE 802.11ad can detect a network beacon frame of a BSS running on a small bandwidth channel of the China 60 GHz frequency band. It should be noted that the beacon frame herein and in the following all refers to the DMG Beacon. Specific steps for implementing network coexistence in the prior art are as follows:

1. A quasi-second PCP, that is, a device that is to be a second PCP, joins a BSS of a first PCP; after becoming a member of the first PCP, the quasi-second PCP sends a large bandwidth channel L2 sharing request to the first PCP.

2. If the first PCP agrees to share the L2, the first PCP notifies the quasi-second PCP of time and a frequency for sending a beacon frame on the L2.

3. The first PCP sends a beacon frame in a first notification period (Notification Period, NP for short) period on the channel L2, and meanwhile the quasi-second PCP sends a beacon frame in a second NP period on the channel L2. The quasi-second PCP completes synchronization with the first PCP by receiving a time stamp in the beacon frame of the first PCP.

4. After a whole NP period consisting of the first NP period and the second NP period ends, a guard interval (Guard Interval, GI for short) is added for channel switching, where the first PCP and the quasi-second PCP separately return, within the GI, to small bandwidth channels S5 and S6 for the BSS to keep running, and corresponding small bandwidth BIs are separately a first SBBI and a second SBBI.

5. A time interval between two whole NPs, that is, an interval of sending a beacon frame on a large bandwidth channel is a variable beacon interval (Variable Beacon Interval, VBI for short). A VBI may include multiple first SBBIs and second SBBIs. In a last first SBBI and a last second SBBI included in the VBI, the first PCP and the quasi-second PCP generate a common quiet period QP, and repeat step 3 and step 4 in the QP, where the QP includes the GI, NP1, and NP2.

After completing the foregoing scheme, the first PCP and the quasi-second PCP that respectively run on the small bandwidth channels S5 and S6 become synchronization pair PCPs. When small bandwidth channels S5 to S8 are used, coexistence with an IEEE 802.11ad device can be implemented by sending, on large bandwidth channel L2 or L3, a common beacon that can be identified by the IEEE 802.11ad device.

However, the coexistence scheme in the prior art can only solve a problem that synchronization pair small bandwidth PCPs (Small Bandwidth PCP, SB-PCP for short) are detected by a large bandwidth PCP (Large Band PCP, LB-PCP for short). However, when the synchronization pair SB-PCPs join a co-channel small bandwidth cluster, a VBI overlaps with a data transfer interval in an SBBI, which causes a conflict between the VBI and the SBBI; in addition, it is not easy for the synchronization pair SB-PCPs to detect a beacon frame of a large bandwidth cluster, that is, it is not easy to monitor cluster synchronization information and control information of the LB-PCP, and therefore clustering on the large bandwidth channel fails.

SUMMARY

A technical problem to be solved by embodiments of the present invention is to provide a clustering method and apparatus, so that multiple devices with different bandwidth and on different channels can perform clustering, which reduces interference and implements coexistence.

To solve the foregoing technical problem, according to a first aspect of the embodiments of the present invention, a clustering method is provided, and may include:

receiving, by a first device, a beacon frame including decentralized cluster information over a target small bandwidth channel, extracting cluster synchronization information and control information of a synchronization device in the beacon frame, and monitoring the target small bandwidth channel in a beacon service period Beacon SP, so as to detect whether the Beacon SP is occupied by another cluster member;

if the first device detects an empty Beacon SP, changing a first variable beacon interval VBI to a second VBI, so that a beginning of the first small bandwidth beacon transmission interval following an end of the second VBI is aligned with a beginning of the empty Beacon SP;

determining whether a quotient of the second VBI divided by a synchronization device beacon interval S-BI of a target small bandwidth cluster is an integer; and if the quotient of the second VBI divided by the synchronization device beacon interval S-BI of the target small bandwidth cluster is an integer, adjusting a corresponding first small bandwidth beacon interval SBBI to be equal to the S-BI, and notifying the second device to adjust a corresponding second SBBI, so that a quotient of the second VBI divided by the second SBBI is an integer; or if the quotient of the second VBI divided by the synchronization device beacon interval S-BI of the target small bandwidth cluster is not an integer, changing a value of the second VBI to a third VBI so that a quotient of the third VBI divided by the S-BI is an integer, adjusting a corresponding first SBBI to be equal to the S-BI, and notifying the second device to adjust a corresponding second SBBI, so that a quotient of the third VBI divided by the second SBBI is an integer; and sending a beacon frame in the empty Beacon SP on the target small bandwidth channel, setting a corresponding Clustering Control field, and joining the target small bandwidth cluster as a cluster member; where the first device and the second device are synchronization pair devices, and the beacon frame is a directional multi-gigabit beacon frame in a 60 GHz technology.

In a first possible implementation manner, the changing a first variable beacon interval VBI to a second VBI may be completed by the first device by negotiation with the second device in a notification period NP, where the NP includes a first NP and a second NP, where the first NP is used for the first device to send a beacon frame on a large bandwidth channel and the second device to receive the beacon frame on the large bandwidth channel; and the second NP is used for the second device to send a beacon frame on the large bandwidth channel and the first device to receive the beacon frame on the large bandwidth channel.

With reference to the first possible implementation manner of the first aspect, in a second possible implementation manner, if the quotient of the second VBI divided by the synchronization device beacon interval S-BI of the target small bandwidth cluster is not an integer, the changing a value of the second VBI to a third VBI so that a quotient of the third VBI divided by the S-BI is an integer may be completed by the first device by negotiation with the second device in the first quiet period QP after the second VBI ends, where the QP includes the NP and a guard interval GI for channel switching.

With reference to the first aspect or the first or the second possible implementation manner of the first aspect, in a third possible implementation manner, the cluster synchronization information and control information of the synchronization device may include: S-BI information, length information of the Beacon SP, and cluster name information.

According to a second aspect of the embodiments of the present invention, a clustering method is provided, and may include:

sending, by a first device, a beacon frame including a cluster probe information element IE to a synchronization device and a second device over a target large bandwidth channel, where the cluster probe IE includes information indicating timeslots reserved by the first device, the second device and the synchronization device;

adding one timeslot to a notification period NP of a next variable beacon interval VBI, and listening for, in the timeslot, an extended cluster report IE returned by the synchronization device, where the extended cluster report IE includes cluster synchronization information and control information of the synchronization device, and the NP includes a first NP and a second NP, where the first NP is used for the first device to send a beacon frame on a large bandwidth channel and the second device to receive the beacon frame on the large bandwidth channel; and the second NP is used for the second device to send a beacon frame on the large bandwidth channel and the first device to receive the beacon frame on the large bandwidth channel;

if the extended cluster report IE returned by the synchronization device is detected in the timeslot, extracting the cluster synchronization information and control information of the synchronization device, and monitoring the target large bandwidth channel in a beacon service period Beacon SP, so as to detect whether the Beacon SP is occupied by another cluster member; and if an empty Beacon SP is detected, sending a beacon frame in the empty Beacon SP on the target large bandwidth channel, setting a corresponding Clustering Control field, joining a target large bandwidth cluster as a cluster member, adding the cluster synchronization information of the synchronization device and a sequence number of the empty Beacon SP to a cluster switch announcement IE, and sending, by using a beacon frame in a next first NP, the cluster switch announcement IE to the second device, so as to instruct the second device to monitor the target large bandwidth channel and join, when an empty Beacon SP is detected, the target large bandwidth cluster; where the first device and the second device are synchronization pair devices, and the beacon frame is a directional multi-gigabit beacon frame in a 60 GHz technology.

In a first possible implementation manner, the sending, by a first device, a beacon frame including a cluster probe IE to a synchronization device over a target large bandwidth channel may include:

directly sending, by the first device, the beacon frame including the cluster probe IE to the synchronization device over the target large bandwidth channel; or directly sending, by the first device, the beacon frame including the cluster probe IE over the target large bandwidth channel, so that a member in a basic service set of the synchronization device reports, after receiving the beacon frame, the beacon frame to the synchronization device.

With reference to the second aspect or the first possible implementation manner of the second aspect, in a second possible implementation manner, when the first device and the second device simultaneously detect, in the timeslots reserved by themselves, the extended cluster report IE returned by the synchronization device, and simultaneously detect an empty Beacon SP, a device that first sends a cluster switch announcement IE in the NP may preferentially join the empty Beacon SP, and the other device keeps monitoring the target large bandwidth channel to search for another empty Beacon SP.

With reference to the second possible implementation manner of the second aspect, in a third possible implementation manner, a quantity of timeslots reserved by the first device is at least one, and a reservation position is in a data transfer interval of the first device and the second device.

According to a third aspect of the embodiments of the present invention, a clustering apparatus is provided, and may include:

a monitoring and detecting module, configured to receive a beacon frame including decentralized cluster information over a target small bandwidth channel, extract cluster synchronization information and control information of a synchronization device in the beacon frame, and monitor the target small bandwidth channel in a beacon service period Beacon SP, so as to detect whether the Beacon SP is occupied by another cluster member;

an interval adjusting module, configured to: if the first device detects an empty Beacon SP, change a first variable beacon interval VBI to a second VBI, so that a beginning of the first small bandwidth beacon transmission interval following an end of the second VBI is aligned with a beginning of the empty Beacon SP;

a determining module, configured to determine whether a quotient of the second VBI divided by a synchronization device beacon interval S-BI of a target small bandwidth cluster is an integer; and if the quotient of the second VBI divided by the synchronization device beacon interval S-BI of the target small bandwidth cluster is an integer, instruct the interval adjusting module to adjust a corresponding first small bandwidth beacon interval SBBI to be equal to the S-BI, and notify the second device to adjust a corresponding second SBBI, so that a quotient of the second VBI divided by the second SBBI is an integer; or if the quotient of the second VBI divided by the synchronization device beacon interval S-BI of the target small bandwidth cluster is not an integer, instruct the interval adjusting module to change a value of the second VBI to a third VBI so that a quotient of the third VBI divided by the S-BI is an integer, instruct the interval adjusting module to adjust a corresponding first SBBI to be equal to the S-BI, and notify the second device to adjust a corresponding second SBBI, so that a quotient of the third VBI divided by the second SBBI is an integer; and a cluster joining module, configured to send a beacon frame in the empty Beacon SP on the target small bandwidth channel, set a corresponding Clustering Control field, and join the target small bandwidth cluster as a cluster member; where the first device and the second device are synchronization pair devices, and the beacon frame is a directional multi-gigabit beacon frame in a 60 GHz technology.

In a first possible implementation manner, the changing, by an interval adjusting module, a first variable beacon interval VBI to a second VBI may be completed by the interval adjusting module by negotiation with the second device in a notification period NP, where the NP includes a first NP and a second NP, where the first NP is used for the first device to send a beacon frame on a large bandwidth channel and the second device to receive the beacon frame on the large bandwidth channel; and the second NP is used for the second device to send a beacon frame on the large bandwidth channel and the first device to receive the beacon frame on the large bandwidth channel.

With reference to the first possible implementation manner of the third aspect, in a second possible implementation manner, if the quotient of the second VBI divided by the synchronization device beacon interval S-BI of the target small bandwidth cluster is not an integer, the instructing the interval adjusting module to change a value of the second VBI to a third VBI so that a quotient of the third VBI divided by the S-BI is an integer may be completed by the interval adjusting module by negotiation with the second device, as instructed by the determining module, in the first quiet period QP after the second VBI ends, where the QP includes the NP and a guard interval GI for channel switching.

With reference to the third aspect or the first or the second possible implementation manner of the third aspect, in a third possible implementation manner, the cluster synchronization information and control information of the synchronization device may include: S-BI information, length information of the Beacon SP, and cluster name information.

According to a fourth aspect of the embodiments of the present invention, a clustering apparatus is provided, and may include:

an information sending module, configured to send a beacon frame including a cluster probe information element IE to a synchronization device and a second device over a target large bandwidth channel, where the cluster probe IE includes information indicating timeslots reserved by a first device, the second device and the synchronization device;

a timeslot reserving module, configured to add one timeslot to a notification period NP of a next variable beacon interval VBI, and listen for, in the timeslot, an extended cluster report IE returned by the synchronization device, where the extended cluster report IE includes cluster synchronization information and control information of the synchronization device, and the NP includes a first NP and a second NP, where the first NP is used for the first device to send a beacon frame on a large bandwidth channel and the second device to receive the beacon frame on the large bandwidth channel; and the second NP is used for the second device to send a beacon frame on the large bandwidth channel and the first device to receive the beacon frame on the large bandwidth channel;

a monitoring and detecting module, configured to: if the extended cluster report IE returned by the synchronization device is detected in the timeslot, extract the cluster synchronization information and control information of the synchronization device, and monitor the target large bandwidth channel in a beacon service period Beacon SP, so as to detect whether the Beacon SP is occupied by another cluster member; and a cluster joining module, configured to: if the monitoring and detecting module detects an empty Beacon SP, send a beacon frame in the empty Beacon SP, set a corresponding Clustering Control field, join a target large bandwidth cluster as a cluster member, add the cluster synchronization information of the synchronization device and a sequence number of the empty Beacon SP to a cluster switch announcement IE, and send, by using a beacon frame in a next first NP, the cluster switch announcement IE to the second device, so as to instruct the second device to monitor the target large bandwidth channel and join, when an empty Beacon SP is detected, the target large bandwidth cluster; where the first device and the second device are synchronization pair devices, and the beacon frame is a directional multi-gigabit beacon frame in a 60 GHz technology.

In a first possible implementation manner, the sending, by an information sending module, a beacon frame including a cluster probe IE to a synchronization device over a target large bandwidth channel may include:

directly sending, by the information sending module, the beacon frame including the cluster probe IE to the synchronization device over the target large bandwidth channel; or directly sending, by the information sending module, the beacon frame including the cluster probe IE over the target large bandwidth channel, so that a member in a basic service set of the synchronization device reports, after receiving the beacon frame, the beacon frame to the synchronization device.

With reference to the fourth aspect or the first possible implementation manner of the fourth aspect, in a second possible implementation manner, when monitoring and detecting modules of the first device and the second device simultaneously detect, in the timeslots reserved by themselves, the extended cluster report IE returned by the synchronization device, and simultaneously detect an empty Beacon SP, a device that first sends a cluster switch announcement IE in the NP may preferentially join the empty Beacon SP, and the other device keeps monitoring the target large bandwidth channel to search for another empty Beacon SP.

With reference to the second possible implementation manner of the fourth aspect, in a third possible implementation manner, a quantity of timeslots reserved by the timeslot reserving module is at least one, and a reservation position is in a data transfer interval of the first device and the second device.

The following beneficial effects are brought by implementing the embodiments of the present invention:

A VBI and an SBBI are separately adjusted so that the interval VBI for sending a beacon frame on a large bandwidth channel no longer conflicts with the interval SBBI for sending a beacon frame on a small bandwidth channel, which can implement clustering of a first PCP on the target small bandwidth channel, and meanwhile reserve a synchronization pair relationship between the first PCP and a second PCP on the large bandwidth channel, so that the first PCP can still be detected by a large bandwidth device; by using a condition for sending a beacon frame on the large bandwidth channel by synchronization pair PCPs, a beacon frame including a cluster probe IE is sent on the large bandwidth channel, and a time for responding to cluster synchronization information and control information by a synchronization PCP is provided in the cluster probe IE, which solves a problem that it is not easy for the synchronization pair PCPs to detect synchronization information and control information of a target large bandwidth cluster, so that the synchronization pair PCPs can join the target large bandwidth cluster in a uniform manner, thereby achieving a beneficial effect of reducing interference between PCPs with different bandwidth and on different channels.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In each embodiment of the present invention, a device that completes clustering may be a PCP, or may be an AP, and a personal basic service set (Personal Basic Service Set, PBSS) established by the PCP and a basic service set established by the AP are both referred to a BSS. The following embodiments all use PCP clustering for description, where a beacon frame is a directional multi-gigabit beacon frame DMG Beacon in a 60 GHz technology.

Figure 2:
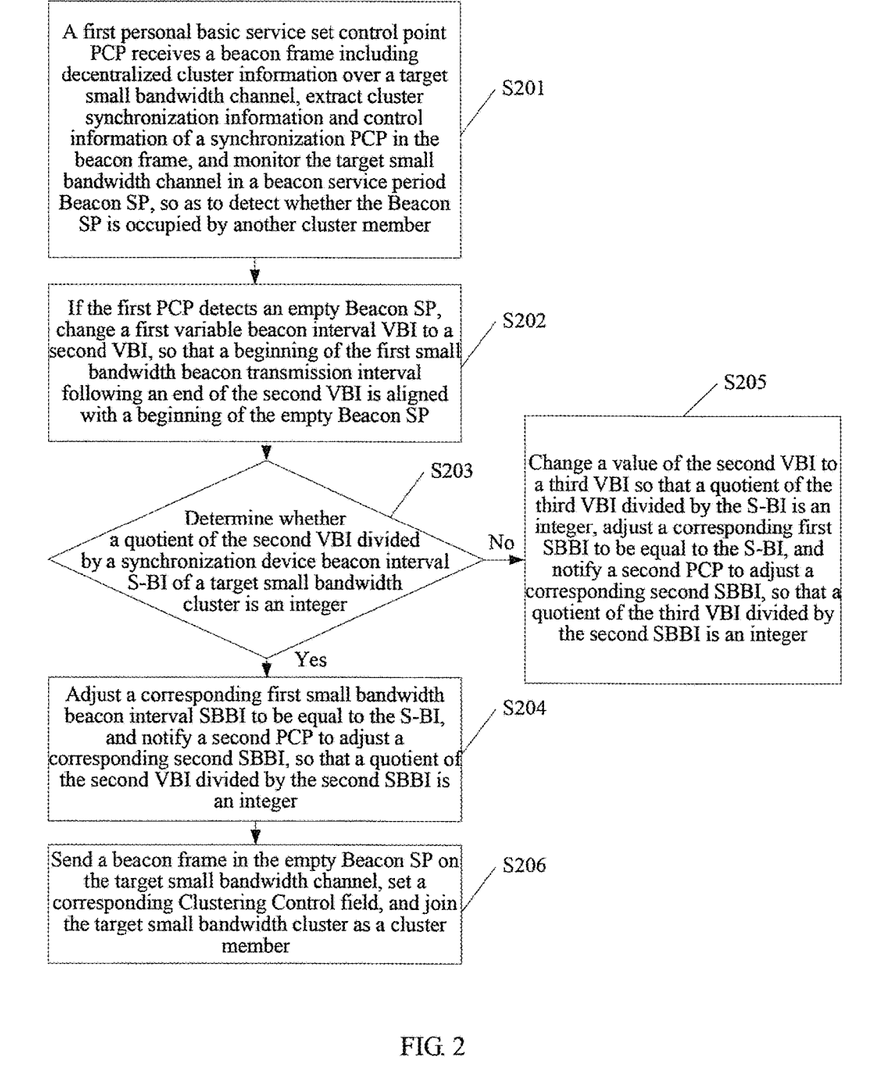
FIG. 2 is a schematic flowchart of a clustering method according to an embodiment of the present invention.

Referring to FIG. 2, it is a schematic flowchart of a clustering method according to an embodiment of the present invention. In this embodiment, the method includes the following steps:

S201. A first personal basic service set control point PCP receives a beacon frame including decentralized cluster information over a target small bandwidth channel, extracts cluster synchronization information and control information of a synchronization PCP in the beacon frame, and monitors the target small bandwidth channel in a beacon service period Beacon SP, so as to detect whether the Beacon SP is occupied by another cluster member.

Specifically, the cluster synchronization information and control information of the synchronization PCP include: S-BI information, length information of the Beacon SP, and cluster name information. The S-BI information is BI information of the synchronization PCP.

S202. If the first PCP detects an empty Beacon SP, change a first variable beacon interval VBI to a second VBI so that a beginning of the first small bandwidth beacon transmission interval following an end of the second VBI is aligned with a beginning of the empty Beacon SP.

Specifically, if the beginning of the first small bandwidth beacon transmission interval following the end of the second VBI is aligned with the beginning of the empty Beacon SP, a value of the first VBI does not need to be changed, or the second VBI is equal to the first VBI. The changing a first variable beacon interval VBI to a second VBI is completed by the first PCP by negotiation with a second PCP in a notification period NP.

The NP includes a first NP and a second NP, where the first NP is used for the first device to send a beacon frame on a large bandwidth channel and the second device to receive the beacon frame on the large bandwidth channel; and the second NP is used for the second device to send a beacon frame on the large bandwidth channel and the first device to receive the beacon frame on the large bandwidth channel. The empty Beacon SP needs to meet the following requirement: After receiving the beacon frame, the first PCP keeps monitoring the target small bandwidth channel in the Beacon SP, and if no beacon frame is received in a time of a subsequent S-BI, then the Beacon SP is empty.

S203. Determine whether a quotient of the second VBI divided by a synchronization PCP beacon interval S-BI of a target small bandwidth cluster is an integer; and if the quotient of the second VBI divided by the synchronization PCP beacon interval S-BI of the target small bandwidth cluster is an integer, perform step S204; or if the quotient of the second VBI divided by the synchronization PCP beacon interval S-BI of the target small bandwidth cluster is not an integer, perform step S205.

S204. Adjust a corresponding first small bandwidth beacon interval SBBI to be equal to the S-BI, and notify a second PCP to adjust a corresponding second SBBI, so that a quotient of the second VBI divided by the second SBBI is an integer.

S205. Change a value of the second VBI to a third VBI so that a quotient of the third VBI divided by the S-BI is an integer, adjust a corresponding first SBBI to be equal to the S-BI, and notify a second PCP to adjust a corresponding second SBBI, so that a quotient of the third VBI divided by the second SBBI is an integer.

Specifically, if the quotient of the second VBI divided by the synchronization PCP beacon interval S-BI of the target small bandwidth cluster is not an integer, the changing a value of the second VBI to a third VBI so that a quotient of the third VBI divided by the S-BI is an integer is completed by the first PCP by negotiation with the second PCP in the first quiet period QP after the second VBI ends, where the QP includes the NP and a guard interval GI for channel switching.

S206. Send a beacon frame in the empty Beacon SP on the target small bandwidth channel, set a corresponding Clustering Control field, and join the target small bandwidth cluster as a cluster member.

Specifically, the first PCP needs to set its own BI information, length information of the Beacon SP, and cluster name information and the like to corresponding items of the synchronization PCP; if no empty Beacon SP is detected, the first PCP cannot join the target small bandwidth cluster.

The first PCP and the second PCP are synchronization pair control points, and the beacon frame is a directional multigigabit beacon frame in a 60 GHz technology. For a specific synchronization pairing process, reference may be made to description in the prior art, and details are not described herein again.

This embodiment describes a process of joining a target small bandwidth cluster by one of synchronization pair PCPs. A VBI and an SBBI are adjusted separately, so that the interval VBI for sending a beacon frame on a large bandwidth channel no longer conflicts with the interval SBBI for sending a beacon frame on a small bandwidth channel, which can implement clustering of a first PCP on the target small bandwidth channel, and meanwhile reserve a synchronization pair relationship between the first PCP and a second PCP on the large bandwidth channel, so that the first PCP can still be detected by a large bandwidth device.

Figure 3:
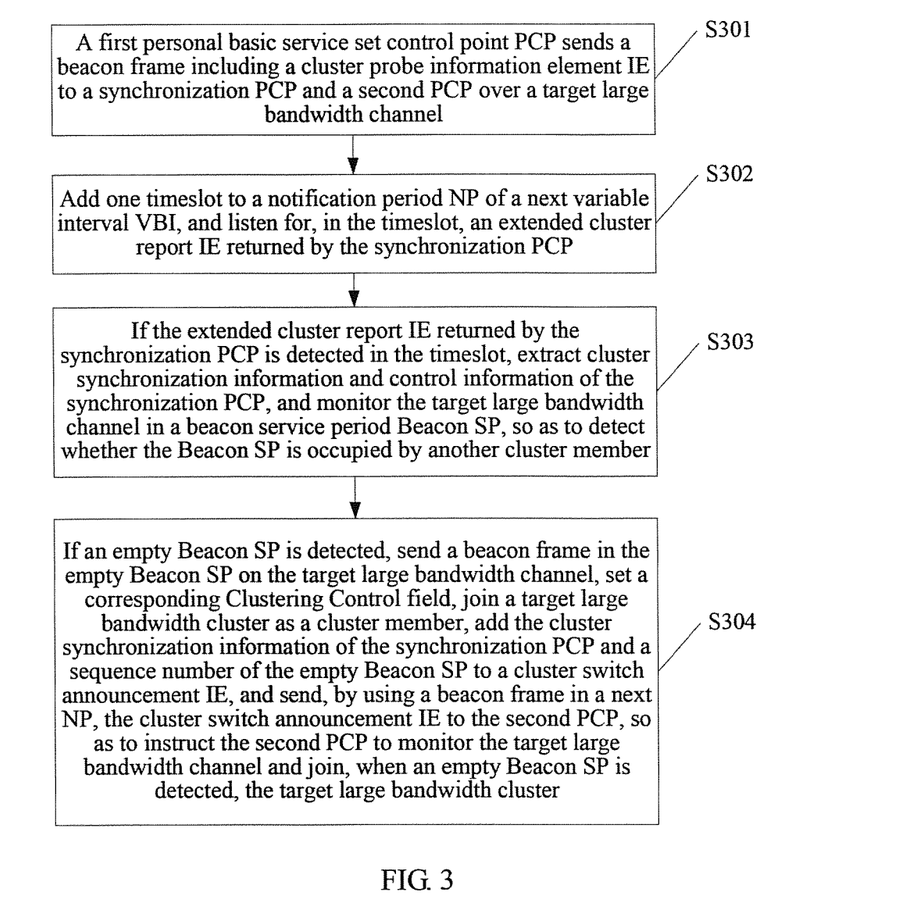
FIG. 3 is a schematic flowchart of another clustering method according to an embodiment of the present invention.

Referring to FIG. 3, FIG. 3 is a schematic flowchart of another clustering method according to an embodiment of the present invention. In this embodiment, the method includes the following steps:

S301. A first personal basic service set control point PCP sends a beacon frame including a cluster probe information element IE to a synchronization PCP and a second PCP over a target large bandwidth channel.

The cluster probe IE includes information indicating timeslots reserved by the first PCP, the second PCP and the synchronization PCP. Specifically, the timeslot reserved by the synchronization PCP may be used to send an extended cluster report IE; the timeslots reserved by the first PCP and the second PCP may be used to receive the extended cluster report IE sent by the synchronization PCP.

By means of a reserved timeslot, interference from another BSS may be shielded in this timeslot, which facilitates the receiving, by the first PCP and the second PCP, the extended cluster report IE sent by the synchronization PCP.

Specifically, the sending, by a first PCP, a beacon frame including a cluster probe IE to a synchronization PCP over a target large bandwidth channel includes:

directly sending, by the first PCP, the beacon frame including the cluster probe IE to the synchronization PCP over the target large bandwidth channel; or directly sending, by the first PCP, the beacon frame including the cluster probe IE over the target large bandwidth channel, so that a member in a basic service set of the synchronization PCP reports, after receiving the beacon frame, the beacon frame to the synchronization PCP.

S302. Add one timeslot to a notification period NP of a next variable interval VBI, and listen for, in the timeslot, an extended cluster report IE returned by the synchronization PCP.

The extended cluster report IE includes cluster synchronization information and control information of the synchronization PCP, and the NP includes a first NP and a second NP, where the first NP is used for the first device to send a beacon frame on a large bandwidth channel and the second device to receive the beacon frame on the large bandwidth channel; and the second NP is used for the second device to send a beacon frame on the large bandwidth channel and the first device to receive the beacon frame on the large bandwidth channel.

Specifically, the cluster synchronization information and control information of the synchronization PCP may include: S-BI information, length information of a Beacon SP, and cluster name information. The S-BI information is BI information of the synchronization PCP.

S303. If the extended cluster report IE returned by the synchronization PCP is detected in the timeslot, extract cluster synchronization information and control information of the synchronization PCP, and monitor the target large bandwidth channel in a beacon service period Beacon SP, so as to detect whether the Beacon SP is occupied by another cluster member.

S304. If an empty Beacon SP is detected, send a beacon frame in the empty Beacon SP on the target large bandwidth channel, set a corresponding Clustering Control field, join a target large bandwidth cluster as a cluster member, add the cluster synchronization information of the synchronization PCP and a sequence number of the empty Beacon SP to a cluster switch announcement IE, and send, by using a beacon frame in a next first NP, the cluster switch announcement IE to the second PCP, so as to instruct the second PCP to monitor the target large bandwidth channel and join, when an empty Beacon SP is detected, the target large bandwidth cluster.

The empty Beacon SP needs to meet the following requirement: After receiving the beacon frame, the first PCP keeps monitoring the target large bandwidth channel in the Beacon SP, and if no beacon frame is received in a time of a subsequent S-BI, it is considered that the Beacon SP is empty.

Specifically, when joining the target large bandwidth cluster, the first PCP or the second PCP need to set their own BI information, length information of the Beacon SP, and cluster name information and the like to corresponding items of the synchronization PCP; if no empty Beacon SP is detected, the first PCP or the second PCP cannot join the target large bandwidth cluster.

More specifically, when the first PCP and the second PCP simultaneously detect, in the timeslots reserved by themselves, the extended cluster report IE returned by the synchronization PCP, and simultaneously detect an empty Beacon SP, a PCP that first sends a cluster switch announcement IE in the NP preferentially joins the empty Beacon SP, and the other PCP keeps monitoring the target large bandwidth channel to search for another empty Beacon SP. This resolves a problem of a sequence of joining the target large bandwidth channel by synchronization pair PCPs. Certainly, processing may also be performed reversely; however, a sequence processing manner provided in this embodiment has a relatively better effect.

In addition, a quantity of timeslots reserved by the first PCP is at least one, and a reservation position is in a data transfer interval of the first PCP and the second PCP.

The first PCP and the second PCP are synchronization pair control points, and the beacon frame is a directional multi-gigabit beacon frame in a 60 GHz technology. For a specific synchronization pairing process, reference may be made to description in the prior art, and details are not described herein again.

This embodiment describes a process of joining a target large bandwidth cluster by synchronization pair PCPs in a uniform manner. By using a condition of sending a beacon frame on a large bandwidth channel by the synchronization pair PCPs, a beacon frame including a cluster probe IE is sent on the large bandwidth channel, and a time for responding to cluster synchronization information and control information by a synchronization PCP is provided in the cluster probe IE, which solves a problem that it is not easy for the synchronization pair PCPs to detect synchronization information and control information of the target large bandwidth cluster, so that the synchronization pair PCPs can join the target large bandwidth cluster in a uniform manner, thereby achieving a beneficial effect of reducing interference between PCPs with different bandwidth and on different channels.

Figure 4:
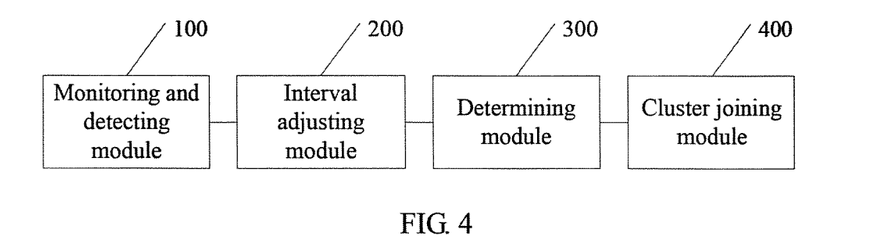
FIG. 4 is a schematic diagram of composition of a clustering apparatus according to an embodiment of the present invention.

Referring to FIG. 4, FIG. 4 is a schematic diagram of composition of a clustering apparatus according to an embodiment of the present invention. In this embodiment, the apparatus includes: a monitoring and detecting module 100, an interval adjusting module 200, a determining module 300, and a cluster joining module 400.

The monitoring and detecting module 100 is configured to receive a beacon frame including decentralized cluster information over a target small bandwidth channel, extract cluster synchronization information and control information of a synchronization PCP in the beacon frame, and monitor the target small bandwidth channel in a beacon service period Beacon SP, so as to detect whether the Beacon SP is occupied by another cluster member.

The interval adjusting module 200 is configured to: if the first PCP detects an empty Beacon SP, change a first variable beacon interval VBI to a second VBI, so that a beginning of the first small bandwidth beacon transmission interval following an end of the second VBI is aligned with a beginning of the empty Beacon SP.

The determining module 300 is configured to determine whether a quotient of the second VBI divided by a synchronization device beacon interval S-BI of a target small bandwidth cluster is an integer; and if the quotient of the second VBI divided by the synchronization device beacon interval S-BI of the target small bandwidth cluster is an integer, instruct the interval adjusting module 200 to adjust a corresponding first small bandwidth beacon interval SBBI to be equal to the S-BI, and notify the second PCP to adjust a corresponding second SBBI, so that a quotient of the second VBI divided by the second SBBI is an integer; or if the quotient of the second VBI divided by the synchronization device beacon interval S-BI of the target small bandwidth cluster is not an integer, instruct the interval adjusting module 200 to change a value of the second VBI to a third VBI so that a quotient of the third VBI divided by the S-BI is an integer, instruct the interval adjusting module 200 to adjust a corresponding first SBBI to be equal to the S-BI, and notify the second PCP to adjust a corresponding second SBBI, so that a quotient of the third VBI divided by the second SBBI is an integer.

The cluster joining module 400 is configured to send a beacon frame in the empty Beacon SP on the target small bandwidth channel, set a corresponding Clustering Control field, and join the target small bandwidth cluster as a cluster member.

The first PCP and the second PCP are synchronization pair control points, and the beacon frame is a directional multi-gigabit beacon frame in a 60 GHz technology.

The changing, by the interval adjusting module 200, a first variable beacon interval VBI to a second VBI is completed by the interval adjusting module by negotiation with the second PCP in a notification period NP.

The NP includes a first NP and a second NP, where the first NP is used for the first device to send a beacon frame on a large bandwidth channel and the second device to receive the beacon frame on the large bandwidth channel; and the second NP is used for the second device to send a beacon frame on the large bandwidth channel and the first device to receive the beacon frame on the large bandwidth channel.

If the quotient of the second VBI divided by the synchronization device beacon interval S-BI of the target small bandwidth cluster is not an integer, the instructing the interval adjusting module to change a value of the second VBI to a third VBI so that a quotient of the third VBI divided by the S-BI is an integer is completed by the interval adjusting module by negotiation with the second PCP, as instructed by the determining module, in the first quiet period QP after the second VBI ends.

The QP includes the NP and a guard interval GI for channel switching.

The cluster synchronization information and control information of the synchronization PCP include: S-BI information, length information of the Beacon SP, and cluster name information.

Figure 5:
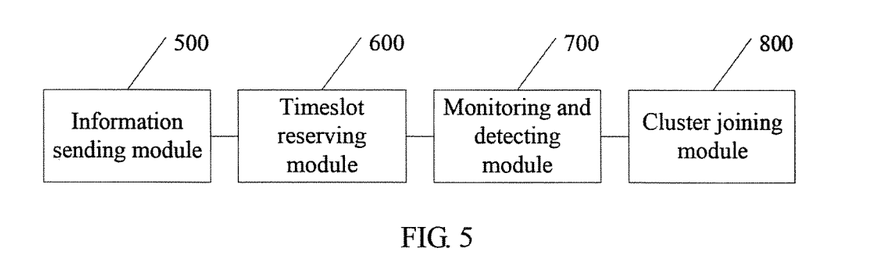
FIG. 5 is a schematic diagram of composition of another clustering apparatus according to an embodiment of the present invention.

Referring to FIG. 5, FIG. 5 is a schematic diagram of composition of another clustering apparatus according to an embodiment of the present invention. In this embodiment, the apparatus includes: an information sending module 500, a timeslot reserving module 600, a monitoring and detecting module 700, and a cluster joining module 800.

The information sending module 500 is configured to send a beacon frame including a cluster probe information element IE to a synchronization PCP and a second PCP over a target large bandwidth channel.

The cluster probe IE includes: information indicating timeslots reserved by a first PCP, the second PCP and the synchronization PCP.

The timeslot reserving module 600 is configured to add one timeslot to a notification period NP of a next variable beacon interval VBI, and listen for, in the timeslot, an extended cluster report IE returned by the synchronization PCP.

The extended cluster report IE includes cluster synchronization information and control information of the synchronization PCP, and the NP includes a first NP and a second NP, where the first NP is used for the first device to send a beacon frame on a large bandwidth channel and the second device to receive the beacon frame on the large bandwidth channel; and the second NP is used for the second device to send a beacon frame on the large bandwidth channel and the first device to receive the beacon frame on the large bandwidth channel.

The monitoring and detecting module 700 is configured to: if the extended cluster report IE returned by the synchronization PCP is detected in the timeslot, extract the cluster synchronization information and control info Elation of the synchronization PCP, and monitor the target large bandwidth channel in a beacon service period Beacon SP, so as to detect whether the Beacon SP is occupied by another cluster member.

The cluster joining module 800 is configured to: if the monitoring and detecting module detects an empty Beacon SP, send a beacon frame in the empty Beacon SP, set a corresponding Clustering Control field, join a target large bandwidth cluster as a cluster member, add the cluster synchronization information of the synchronization PCP and a sequence number of the empty Beacon SP to a cluster switch announcement IE, and send, by using a beacon frame in a next first NP, the cluster switch announcement IE to the second PCP, so as to instruct the second PCP to monitor the target large bandwidth channel and join, when an empty Beacon SP is detected, the target large bandwidth cluster.

The first PCP and the second PCP are synchronization pair control points, and the beacon frame is a directional multi-gigabit beacon frame in a 60 GHz technology.

The sending, by the information sending module, a beacon frame including a cluster probe IE to a synchronization PCP over a target large bandwidth channel includes:

directly sending, by the info illation sending module, the beacon frame including the cluster probe IE to the synchronization PCP over the target large bandwidth channel; or directly sending, by the information sending module, the beacon frame including the cluster probe IE over the target large bandwidth channel, so that a member in a basic service set of the synchronization PCP reports, after receiving the beacon frame, the beacon frame to the synchronization PCP.

When monitoring and detecting modules of the first PCP and the second PCP simultaneously detect, in the timeslots reserved by themselves, the extended cluster report IE returned by the synchronization PCP, and simultaneously detect an empty Beacon SP, a PCP that first sends a cluster switch announcement IE in the NP preferentially joins the empty Beacon SP, and the other PCP keeps monitoring the target large bandwidth channel to search for another empty Beacon SP.

A quantity of timeslots reserved by the timeslot reserving module is at least one, and a reservation position is in a data transfer interval of the first PCP and the second PCP.

It should be noted that the clustering apparatus in this embodiment and a clustering apparatus in the previous embodiment may be a same entity apparatus, where this embodiment mainly describes joining a target large bandwidth cluster by synchronization pair PCPs in a uniform manner, and the previous embodiment mainly describes joining a target small bandwidth cluster by one of synchronization pair PCPs. The foregoing two processes may be implemented on one clustering apparatus in a uniform manner by completing a corresponding operation according to an attribute of a target cluster to be joined.

According to descriptions of the foregoing embodiments, the present invention has the following advantages:

A VBI and an SBBI are separately adjusted so that the interval VBI for sending a beacon frame on a large bandwidth channel no longer conflicts with the interval SBBI for sending a beacon frame on a small bandwidth channel, which can implement clustering of a first PCP on the target small bandwidth channel, and meanwhile reserve a synchronization pair relationship between the first PCP and a second PCP on the large bandwidth channel, so that the first PCP can still be detected by a large bandwidth device; by using a condition for sending a beacon frame on the large bandwidth channel by synchronization pair PCPs, a beacon frame including a cluster probe IE is sent on the large bandwidth channel, and a time for responding to cluster synchronization information and control information by a synchronization PCP is provided in the cluster probe IE, which solves a problem that it is not easy for the synchronization pair PCPs to detect synchronization information and control information of a target large bandwidth cluster, so that the synchronization pair PCPs can join the target large bandwidth cluster in a uniform manner, thereby achieving a beneficial effect of reducing interference between PCPs with different bandwidth and on different channels.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include: a maynetic disk, an optical disc, a read-only memory (Read-Only Memory, ROM for short), or a random access memory (Random Access Memory, RAM for short).

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A clustering method, comprising:
receiving, by a first device, a beacon frame comprising decentralized cluster information over a target small bandwidth channel, extracting cluster synchronization information and control information of a synchronization device in the beacon frame, and monitoring the target small bandwidth channel in a beacon service period (Beacon SP);
when the first device detects an empty Beacon SP, changing a first variable beacon interval (VBI) to a second VBI, so that a beginning of the first small bandwidth beacon transmission interval following an end of the second VBI is aligned with a beginning of the empty Beacon SP;
determining whether a quotient of the second VBI divided by a synchronization device beacon interval (S-BI) of a target small bandwidth cluster is an integer, and when the quotient of the second VBI divided by the S-BI of the target small bandwidth cluster is an integer, adjusting a corresponding first small bandwidth beacon interval (SBBI) to be equal to the S-BI, and notifying a second device to adjust a corresponding second SBBI, so that a quotient of the second VBI divided by the second SBBI is an integer, or when the quotient of the second VBI divided by the S-BI of the target small bandwidth cluster is not an integer, changing a value of the second VBI to a value of a third VBI so that a quotient of the third VBI divided by the S-BI is an integer, adjusting a corresponding first SBBI to be equal to the S-BI, and notifying the second device to adjust a corresponding second SBBI, so that a quotient of the third VBI divided by the second SBBI is an integer;
sending a beacon frame in the empty Beacon SP on the target small bandwidth channel, setting a corresponding Clustering Control field, and joining the target small bandwidth cluster as a cluster member; and
wherein the first device and the second device are synchronization pair devices, and the beacon frame is a directional multi-gigabit beacon frame in a 60 GHz technology.

2. The method according to claim 1, further comprising:
changing a first VBI to a second VBI is completed by the first device by negotiation with the second device in a notification period (NP) comprising a first NP and a second NP, wherein:
the first NP is used for the first device to send a beacon frame on a large bandwidth channel and the second device to receive the beacon frame on the large bandwidth channel, and
the second NP is used for the second device to send a beacon frame on the large bandwidth channel and the first device to receive the beacon frame on the large bandwidth channel.

3. The method according to claim 2, further comprising:
when the quotient of the second VBI divided by the S-BI of the target small bandwidth cluster is not an integer, changing a value of the second VBI to a third VBI so that a quotient of the third VBI divided by the S-BI is an integer is completed by the first device by negotiation with the second device in a first quiet period (QP) after the second VBI ends, wherein the QP comprises the NP and a guard interval (GI) for channel switching.

4. The method according to claim 1, wherein the cluster synchronization information and control information of the synchronization device comprise: S-BI information, length information of the Beacon SP, and cluster name information.

5. A clustering method, comprising:
sending, by a first device, a beacon frame comprising a cluster probe information element (IE) to a synchronization device and a second device over a target large bandwidth channel, wherein the cluster probe IE comprises information indicating timeslots reserved by the first device, the second device and the synchronization device;
adding one timeslot to a notification period (NP) of a next variable beacon interval (VBI), and listening for, in the timeslot, an extended cluster report IE returned by the synchronization device, wherein the extended cluster report IE comprises cluster synchronization information and control information of the synchronization device, and the NP comprises a first NP and a second NP, wherein the first NP is used for the first device to send a beacon frame on a large bandwidth channel and the second device to receive the beacon frame on the large bandwidth channel, and wherein the second NP is used for the second device to send a beacon frame on the large bandwidth channel and the first device to receive the beacon frame on the large bandwidth channel;
when the extended cluster report IE returned by the synchronization device is detected in the timeslot, extracting the cluster synchronization information and control information of the synchronization device, and monitoring the target large bandwidth channel in a beacon service period (Beacon SP);
when an empty Beacon SP is detected, sending a beacon frame in the empty Beacon SP on the target large bandwidth channel, setting a corresponding Clustering Control field, joining a target large bandwidth cluster as a cluster member, adding the cluster synchronization information of the synchronization device and a sequence number of the empty Beacon SP to a cluster switch announcement IE, and sending, by using a beacon frame in a next first NP, the cluster switch announcement IE to the second device, so as to instruct the second device to monitor the target large bandwidth channel and join, when an empty Beacon SP is detected, the target large bandwidth cluster; and
wherein the first device and the second device are synchronization pair devices, and the beacon frame is a directional multi-gigabit beacon frame in a 60 GHz technology.

6. The clustering method according to claim 5, wherein sending, by a first device, a beacon frame comprising a cluster probe IE to a synchronization device over a target large bandwidth channel comprises:

directly sending, by the first device, the beacon frame comprising the cluster probe IE to the synchronization device over the target large bandwidth channel; or directly sending, by the first device, the beacon frame comprising the cluster probe IE over the target large bandwidth channel, so that a member in a basic service set of the synchronization device reports, after receiving the beacon frame, the beacon frame to the synchronization device.

7. The clustering method according to claim 5, further comprising:

when the first device and the second device simultaneously detect, in the timeslots reserved by themselves, the extended cluster report IE returned by the synchronization device, and simultaneously detect an empty Beacon SP, a device that first sends a cluster switch announcement IE in the NP preferentially joins the empty Beacon SP, and the other device keeps monitoring the target large bandwidth channel to search for another empty Beacon SP.

8. The clustering method according to claim 7, wherein a quantity of timeslots reserved by the first device is at least one, and a reservation position is in a data transfer interval of the first device and the second device.

9. A clustering apparatus, comprising:

a receiver, configured to:
  receive a beacon frame comprising decentralized cluster information over a target small bandwidth channel,
  extract cluster synchronization information and control information of a synchronization device in the beacon frame, and
  monitor the target small bandwidth channel in a beacon service period (Beacon SP);

a processor, configured to:
  when the first device detects an empty Beacon SP, change a first variable beacon interval (VBI) to a second VBI, so that a beginning of the first small bandwidth beacon transmission interval following an end of the second VBI is aligned with a beginning of the empty Beacon SP, determine whether a quotient of the second VBI divided by a synchronization device beacon interval (S-BI) of a target small bandwidth cluster is an integer,
  when the quotient of the second VBI divided by the S-BI of the target small bandwidth cluster is an integer, instruct the interval adjusting module to adjust a corresponding first small bandwidth beacon interval (SBBI) to be equal to the S-BI, and notify the second device to adjust a corresponding second SBBI, so that a quotient of the second VBI divided by the second SBBI is an integer, or when the quotient of the second VBI divided by the S-BI of the target small bandwidth cluster is not an integer, instruct the interval adjusting module to change a value of the second VBI to a third VBI so that a quotient of the third VBI divided by the S-BI is an integer, instruct the interval adjusting module to adjust a corresponding first SBBI to be equal to the S-BI, and notify the second device to adjust a corresponding second SBBI, so that a quotient of the third VBI divided by the second SBBI is an integer, and
  send a beacon frame in the empty Beacon SP on the target small bandwidth channel, set a corresponding Clustering Control field, and join the target small bandwidth cluster as a cluster member; and wherein the first device and the second device are synchronization pair devices, and the beacon frame is a directional multi-gigabit beacon frame in a 60 GHz technology.

10. The apparatus according to claim 9, wherein:

the processor is configured to change a first variable beacon interval VBI to a second VBI is completed by the interval adjusting module by negotiation with the second device in a notification period (NP) comprising a first NP and a second NP, and wherein, the first NP is used for the first device to send a beacon frame on a large bandwidth channel and the second device to receive the beacon frame on the large bandwidth channel; and the second NP is used for the second device to send a beacon frame on the large bandwidth channel and the first device to receive the beacon frame on the large bandwidth channel.

11. The apparatus according to claim 10, wherein when the quotient of the second VBI divided by the S-BI of the target small bandwidth cluster is not an integer, the processor is configured to change a value of the second VBI to a third VBI so that a quotient of the third VBI divided by the S-BI is an integer is completed by the interval adjusting module by negotiation with the second device, as instructed by the determining module, in a first quiet period (QP) after the second VBI ends, wherein the QP comprises the NP and a guard interval (GI) for channel switching.

12. The apparatus according to claim 9, wherein the cluster synchronization information and control information of the synchronization device comprise: S-BI information, length information of the Beacon SP, and cluster name information.

13. A clustering apparatus, comprising:

a transmitter, configured to transmit a beacon frame comprising a cluster probe information element (IE) to a synchronization device and a second device over a target large bandwidth channel, wherein the cluster probe IE comprises information indicating timeslots reserved by a first device, the second device and the synchronization device;

a processor, configured to:
  add one timeslot to a notification period (NP) of a next variable beacon interval VBI, and listen for, in the timeslot, an extended cluster report IE returned by the synchronization device, wherein the extended cluster report IE comprises cluster synchronization information and control information of the synchronization device, and the NP comprises a first NP and a second NP, wherein the first NP is used for the first device to send a beacon frame on a large bandwidth channel and the second device to receive the beacon frame on the large bandwidth channel, and the second NP is used for the second device to send a beacon frame on the large bandwidth channel and the first device to receive the beacon frame on the large bandwidth channel,
  when the extended cluster report IE returned by the synchronization device is detected in the timeslot, extract the cluster synchronization information and control information of the synchronization device, and monitor the target large bandwidth channel in a beacon service period (Beacon SP), and
  when the monitoring and detecting module detects an empty Beacon SP, send a beacon frame in the empty Beacon SP, set a corresponding Clustering Control field, join a target large bandwidth cluster as a cluster member, add the cluster synchronization information of the synchronization device and a sequence number of the empty Beacon SP to a cluster switch announcement IE, and send, by using a beacon frame in a next first NP, the cluster switch announcement IE to the second device, so as to instruct the second device to monitor the target large bandwidth channel and join, when an empty Beacon SP is detected, the target large bandwidth cluster; and wherein the first device and the second device are synchronization pair devices, and the beacon frame is a directional multi-gigabit beacon frame in a 60 GHz technology.

14. The clustering apparatus according to claim 13, wherein the transmitter is configured to:

transmit the beacon frame comprising the cluster probe IE to the synchronization device over the target large bandwidth channel; or transmit the beacon frame comprising the cluster probe IE over the target large bandwidth channel, so that a member in a basic service set of the synchronization device reports, after receiving the beacon frame, the beacon frame to the synchronization device.

15. A non-transitory computer-readable storage medium comprising instructions that, when executed by a processor in a first device, cause the first device to:

receive a beacon frame comprising decentralized cluster info' cation over a target small bandwidth channel, extract cluster synchronization information and control information of a synchronization device in the beacon frame, and monitor the target small bandwidth channel in a beacon service period (Beacon SP);

when an empty Beacon SP is detected, change a first variable beacon interval (VBI) to a second VBI, so that a beginning of the first small bandwidth beacon transmission interval following an end of the second VBI is aligned with a beginning of the empty Beacon SP;

determine whether a quotient of the second VBI divided by a synchronization device beacon interval (S-BI) of a target small bandwidth cluster is an integer, and when the quotient of the second VBI divided by the S-BI of the target small bandwidth cluster is an integer, adjust a corresponding first small bandwidth beacon interval (SBBI) to be equal to the S-BI, and notify a second device to adjust a corresponding second SBBI, so that a quotient of the second VBI divided by the second SBBI is an integer, or when the quotient of the second VBI divided by the S-BI of the target small bandwidth cluster is not an integer, change a value of the second VBI to a value of a third VBI so that a quotient of the third VBI divided by the S-BI is an integer, adjust a corresponding first SBBI to be equal to the S-BI, and notify the second device to adjust a corresponding second SBBI, so that a quotient of the third VBI divided by the second SBBI is an integer;

send a beacon frame in the empty Beacon SP on the target small bandwidth channel, set a corresponding Clustering Control field, and join the target small bandwidth cluster as a cluster member; and wherein the first device and the second device are synchronization pair devices, and the beacon frame is a directional multi-gigabit beacon frame in a 60 GHz technology.

16. The non-transitory computer-readable storage medium according to claim 15, wherein the instructions, when executed by the processor, cause the first device to:

change a first VBI to a second VBI by negotiation with the second device in a notification period (NP) comprising a first NP and a second NP, wherein:

the first NP is used for the first device to send a beacon frame on a large bandwidth channel and the second device to receive the beacon frame on the large bandwidth channel, and the second NP is used for the second device to send a beacon frame on the large bandwidth channel and the first device to receive the beacon frame on the large bandwidth channel.

17. The non-transitory computer-readable storage medium according to claim 16, wherein the instructions, when executed by the processor, cause the first device to:

when the quotient of the second VBI divided by the S-BI of the target small bandwidth cluster is not an integer, change a value of the second VBI to a third VBI so that a quotient of the third VBI divided by the S-BI is an integer is completed by the first device by negotiation with the second device in a first quiet period (QP) after the second VBI ends, wherein the QP comprises the NP and a guard interval (GI) for channel switching.

18. A non-transitory computer-readable storage medium comprising instructions that, when executed by a processor in a first device, cause the first device to:

send a beacon frame comprising a cluster probe information element (IE) to a synchronization device and a second device over a target large bandwidth channel, wherein the cluster probe IE comprises information indicating timeslots reserved by the first device, the second device and the synchronization device;

add one timeslot to a notification period (NP) of a next variable beacon interval (VBI), and listen for, in the timeslot, an extended cluster report IE returned by the synchronization device, wherein the extended cluster report IE comprises cluster synchronization information and control information of the synchronization device, and the NP comprises a first NP and a second NP, wherein the first NP is used for the first device to send a beacon frame on a large bandwidth channel and the second device to receive the beacon frame on the large bandwidth channel, and wherein the second NP is used for the second device to send a beacon frame on the large bandwidth channel and the first device to receive the beacon frame on the large bandwidth channel;

when the extended cluster report IE returned by the synchronization device is detected in the timeslot, extract the cluster synchronization information and control information of the synchronization device, and monitor the target large bandwidth channel in a beacon service period (Beacon SP);

when an empty Beacon SP is detected, send a beacon frame in the empty Beacon SP on the target large bandwidth channel, set a corresponding Clustering Control field, join a target large bandwidth cluster as a cluster member, add the cluster synchronization information of the synchronization device and a sequence number of the empty Beacon SP to a cluster switch announcement IE, and send, by using a beacon frame in a next first NP, the cluster switch announcement IE to the second device, so as to instruct the second device to monitor the target large bandwidth channel and join, when an empty Beacon SP is detected, the target large bandwidth cluster; and wherein the first device and the second device are synchronization pair devices, and the beacon frame is a directional multi-gigabit beacon frame in a 60 GHz technology.

19. The non-transitory computer-readable storage medium according to claim 18, wherein to send the beacon frame comprising the cluster probe IE to the synchronization device, the instructions, when executed by the processor, cause the first device to:
   directly send the beacon frame comprising the cluster probe IE to the synchronization device over the target large bandwidth channel; or
   directly send the beacon frame comprising the cluster probe IE over the target large bandwidth channel, so that a member in a basic service set of the synchronization device reports, after receiving the beacon frame, the beacon frame to the synchronization device.

20. The non-transitory computer-readable storage medium according to claim 18, wherein the instructions, when executed by the processor, cause the first device to:
   when the first device and the second device simultaneously detect, in the timeslots reserved by themselves, the extended cluster report IE returned by the synchronization device, and simultaneously detect an empty Beacon SP, a device that first sends a cluster switch announcement IE in the NP preferentially joins the empty Beacon SP, and the other device keeps monitoring the target large bandwidth channel to search for another empty Beacon SP.

* * * * *